Aug. 1, 1967 T. H. ABBIATI ET AL 3,333,871
CONDUIT FITTINGS
Filed March 18, 1965 2 Sheets-Sheet 1
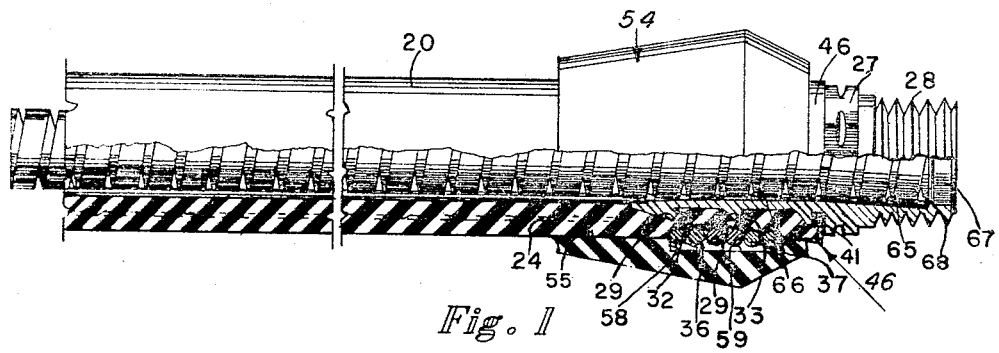
Fig. 1
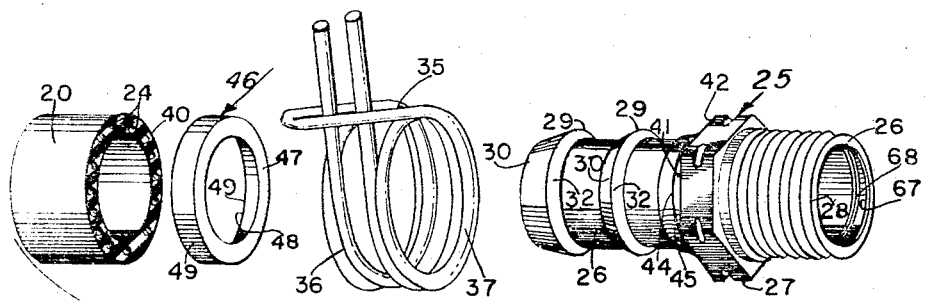
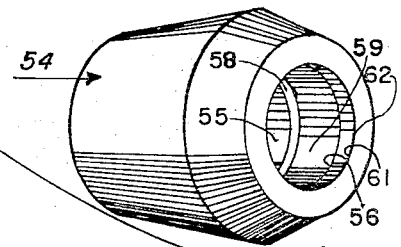
Fig. 2
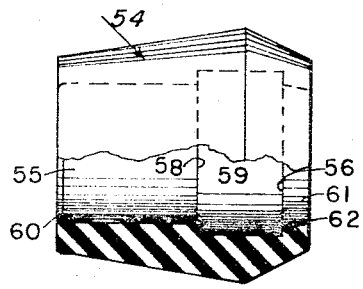
Fig. 3
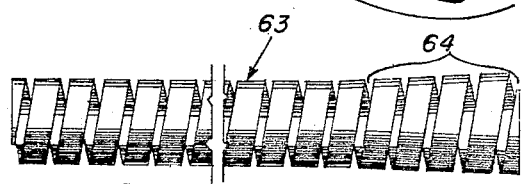
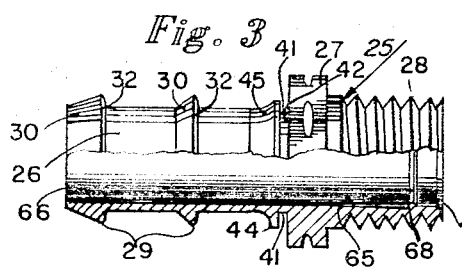
Fig. 4
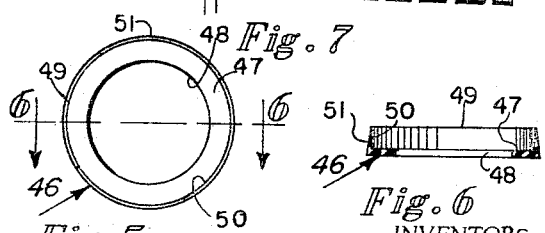
Fig. 5  Fig. 6
INVENTORS
Theodore H. Abbiati
Orial E. Chetelat
BY Roger F. Crandell
ATTORNEY

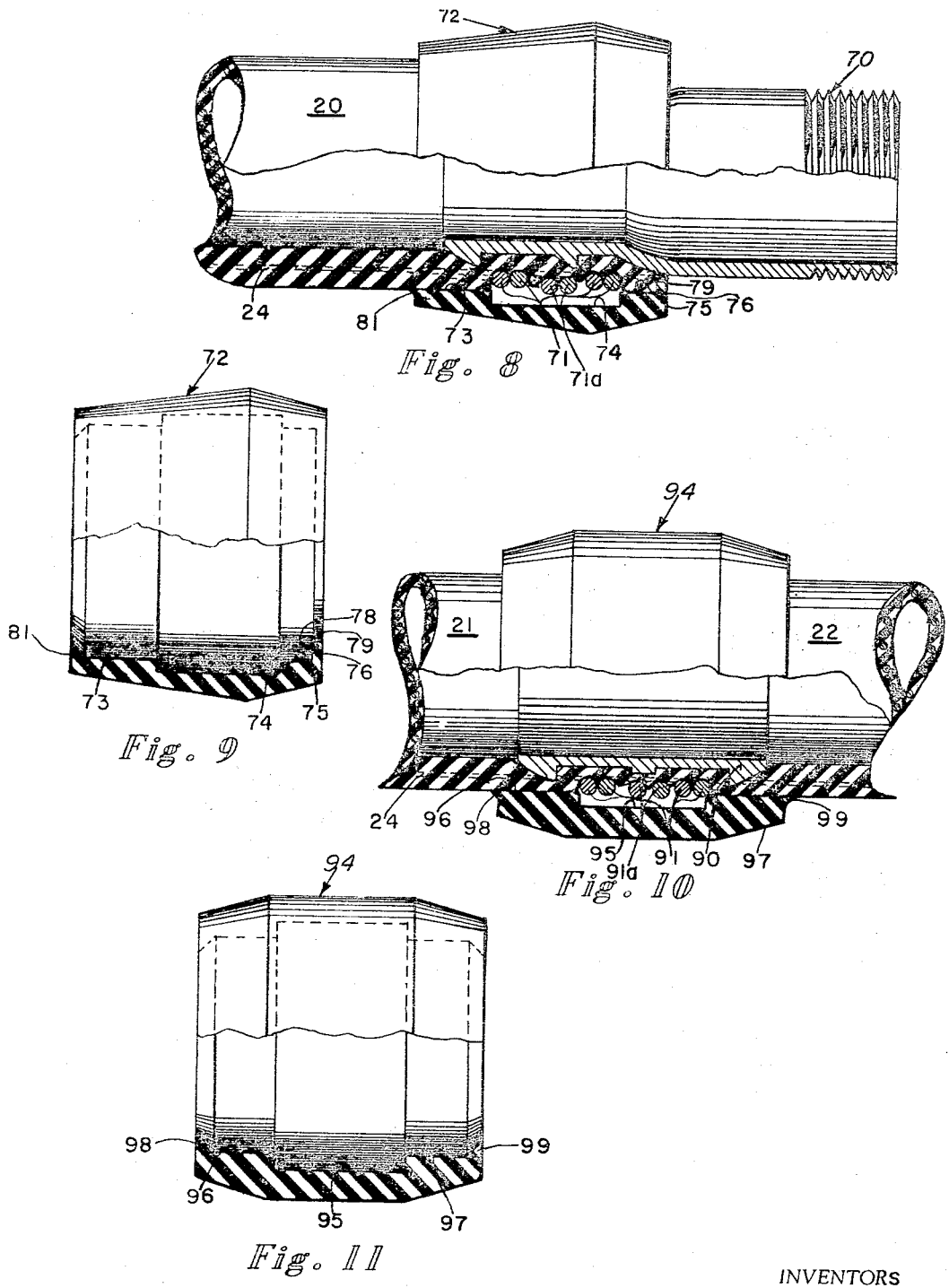

United States Patent Office 3,333,871
Patented Aug. 1, 1967

3,333,871
CONDUIT FITTINGS
Theodore H. Abbiati and Orial E. Chetelat, Denver, Colo., assignors to Screw Machine Products Co., Denver, Colo., a corporation of Colorado
Filed Mar. 18, 1965, Ser. No. 440,761
2 Claims. (Cl. 285—45)

ABSTRACT OF THE DISCLOSURE

A connector fitting assembly for flexible conduit, which fitting assembly includes a nipple insertable into the conduit, an external clamp for securing the conduit to the nipple, a cap for enclosing the cut end of the conduit, a protective sleeve surrounding the conduit end and clamp, and a reinforcing and supporting spring insertable into the conduit.

Background of the invention

The present invention relates to fittings for flexible conduit and more particularly to fittings for use with yieldable resilient conduit such as rubber and plastic hose or tubes, and particularly with conduit which includes woven cord or wire reinforcing materials.

While wire clamps used with fittings of the character to which the present invention relates have been shown in U.S. Patent No. 2,871,738 and No. 3,106,758 issued to Theodore H. Abbiati, it will be appreciated that the present invention finds use and application with fittings and fitting clamps of types other than shown in the aforesaid patents.

Objects and summary of the invention

The principal object of the present invention is to provide an improved fitting for flexible conduit which includes a wire or other external clamp enclosed within the fitting and protected against damage from contact by external objects. A related object is to provide a fitting in which an external wire clamp is completely enclosed so that the clamp will not damage objects to which it may come into contact, thereby making the fitting suitable for use with gasoline hoses and the like which might scratch or mar the finish on automobiles or other objects into which it comes into contact.

A further object of the present invention is to protect reinforcement cord used in flexible conduit against deterioration by contact with gasoline or other substance spilled upon the conduit or the fitting.

Still another object of the present invention is to provide a fitting which increases the support given to the associated conduit by increasing the radius of curvature of the conduit at its point of attachment to the fitting thereby to prevent damage to the conduit resulting from bending, kinking or flexing.

Still a further object of the present invention is to provide a fitting which is suitable for use on large conduit and for joining sections of conduit while maintaining the foregoing objectives.

A related object of the present invention is to provide improved means for tightly fastening a reinforcing spring within the fitting and conduit.

Still a further object of the invention is to provide a fitting embodying an external steel wire clamp which is fully protected from abrasive action and consequent wear and corrosion resulting from the hose and fitting being dragged over concrete or other surfaces or over the ground.

Still another object of the invention is to render a steel clamp non-sparking and non-hazardous for use in explosive or flammable environments in which the hose or conduit may be dragged over material which would result in the formation of a spark by contact with the wire clamp.

Fittings embodying the present invention, in conformity with the foregoing objects, comprise a tubular body having on its inner end a nipple insertable into a cut end of a conduit, a suitable fastening means on its outer end, and an intermediate wrench engaging portion. When the nipple is inserted into the conduit, an external clamp is applied to secure the conduit thereto. A spiral reinforcing spring is inserted through the outer end of the fitting into the conduit, the spring having an enlarged tapered outer end which frictionally seats in a tapered bore in the fitting. The fitting further includes an annular cap for sealingly engaging the cut end of the conduit, and an outer protective sleeve for protectively surrounding the conduit and clamp.

Description of the drawings

FIGURE 1 is an elevation view, partly in section, of a fitting embodying the present invention.
FIGURE 2 is an exploded or disassembled view of the fitting shown in FIGURE 1, but without the spring which is shown in FIGURE 7.
FIGURE 3 is an elevational view, partly in section, of a protective sleeve forming a part of the fitting shown in FIGURE 1.
FIGURE 4 is an elevation view, partly in section, of a fitting nipple forming a part of the invention shown in FIGURE 1.
FIGURE 5 is a plan view of a protective end cap forming a part of the invention shown in FIGURE 1.
FIGURE 6 is a section view taken substantially in the plane of line 6—6 on FIGURE 5.
FIGURE 7 is an elevation view of a reinforcing spring forming a part of the invention shown in FIGURE 1.
FIGURE 8 is an elevation view, partly in section, of a modified form of fitting embodying the present invention.
FIGURE 9 is an elevation view partly in section of a protective sleeve forming a part of the form of the invention shown in FIGURE 8.
FIGURE 10 is an elevation view, partly in section, of a fitting embodying the present invention and of a character useful for splicing two conduit sections.
FIGURE 11 is an elevation view partly in section of a protective sleeve forming a part of the form of the invention shown in FIGURE 10.

Description of the preferred embodiment

The conduit fittings shown in the drawings as illustrative of the present invention are adapted for use on the end of flexible conduit 20 as shown in FIGURES 1 and 8, or for the purpose of joining or splicing two sections of conduit 21, 22 as shown in FIGURE 10. The flexible conduit is suitably formed of one of numerous materials commonly employed for such purposes, such as rubber, neoprene, Teflon and the like. Additionally, the tubing may be reinforced with woven cloth or wire 24 wound spirally within the conduit walls.

Referring to FIGURES 1 and 2, the fitting there shown comprises a nipple 25 having a tubular or sleeve-like body provided with an anular end portion 26 having external threads 28 for use in connecting the conduit to nozzles and the like (not shown). Additionally, the nipple is provided with appropriate wrench pads 27 for engagement by a wrench (not shown). For insertion within the conduit 20, the fitting nipple 25 includes an extended nipple portion 26 having a pair of spaced ridges or barbs 29 formed thereon, which barbs 29 are formed by outwardly tapering external surfaces 30, sloping upwardly and outwardly and terminating in an abrupt face 32, directed toward the threaded end of the nipple 25. When the nipple is inserted with one end 40 of a hose or conduit 20, clamp 35, such as the type shown in U.S. Patent No. 3,106,758, is applied around the external surface of the conduit and in a position such that coils 36, 37 of the clamp constrict into the external surface of the hose and squeeze the hose tightly against the nipple 25. It will be appreciated that it is not necessary to cut away the rubber from the fabric of the hose in order to attach this fitting nipple and clamp. The coils 36 and 37 are positioned so that they are in front of the abrupt faces 32 of the barbs 29 so that when the clamp is tightened, the barbs 29 prevent the nipple from being pulled out of the conduit or forced out by pressure of fluid carried within the conduit. One method of applying a wire clamp is described in U.S. Patent No. 2,871,738.

It will be appreciated that when the nipple 25 is inserted within the conduit and the wire clamp 35 applied thereto, the free or cut end 40 of the conduit 20 remains exposed. Thus, any woven wire or cord 24 in the walls of the conduit will be exposed and will be subjected to contact by gasoline or other material which might accidentally be spilled. Moreover, where such a conduit and fitting is used in a gasoline service station, gasoline may splash from the nozzle or from the automobile tank and come into contact with the conduit, the fitting and the nozzle.

With cloth or fabric reinforcement 24, gasoline or other liquid is absorbed in the cords by wick or capillary action. If the fitting is reinforced with wire, water will rust and weaken the wire. Moreover, water or gasoline will rot and weaken the cord and thereby weaken the hose resulting in rupture and breaks.

Accordingly, in accordance with one aspect of the present invention, means are provided, associated directly with the fitting nipple 25, for protecting the exposed or cut end 40 of the conduit 20. To this end, the nipple is provided, at a point adjacent the wrench pads 27, with a groove 41 defined at one side by a radial face 42 of the wrench pads 27 and at the other side by a ridge 44 formed by a sloping shoulder 45 on the fitting nipple 25, said shoulder sloping in the same direction as the sloping projections 30, forming the clamp-engaging barbs 29. It can also be seen that when the conduit is inserted over the nipple, the inner surface of the conduit is frictionally engaged by the respective barbs 29 and the ridge 44.

Received within the groove 41 is an annular cup-shaped end cap 46 which (FIGURES 5 and 6) protectively engages the conduit end 40. More specifically, the end cap 46 includes a flat annular washer portion 47 defining an opening 48 adapted to receive the nipple when the annular portion 47 is forcibly slipped over the fitting shoulder 44 and into the groove 41. Projecting axially from the outer circumferential edges of the washer portion 47 of the end cap 46 is a sleeve-like projection 49 adapted to surround and receive the free end of the conduit 20 as shown in FIGURE 1. When the conduit 20 is inserted over the nipple 25, the end cap 46 is desirably cemented to the cut end 40 of the conduit with an appropriate cement, such as rubber cement, or other adhesive sealing material. The sleeve portion 49 of the end cap 46 is desirably tapered to provide a thin edge which merges into the surface of the conduit as shown in FIGURE 1, thereby preventing an abrupt projection which might be damaged. The taper extends generally inward so that the inner surface 50 of the sleeve 49 extends in a generally axial direction while the outer surface 51 is tapered.

For purposes of protecting the clamp and fitting after application of the clamp 35 to the conduit 20, the invention further contemplates the provision of an external protective sleeve 54 adapted to fit over the clamp 35 and sealingly engage the protective end cap 46. One illustrative sleeve is shown in FIGURE 3 and comprises a stiffly resilient sleeve of a suitable material such as Buna N rubber, the internal surface 55 of which has a pair of spaced opposed shoulders 56, 58 defined therein and forming an internal groove 59 adapted to receive the coils and locking portion of the clamp 35, the latter being more fully described and shown in U.S. Patent No. 2,871,738, when the sleeve 54 is inserted over the fitting. Desirably, the internal surface 55 is of a diameter such that it snugly engages the external surface of the conduit 20. In order to insure a sealing engagement between the sleeve 54 and the conduit 20, the protective sleeve 54 is provided at one end with an inwardly tapering ridge 60 (FIGURE 3) directed inwardly from the internal surface 55 and adapted to snugly engage the conduit 20. At the opposite end of the sleeve, and at a point adjacent the internal groove 59, the protective sleeve 54 is provided with a second inwardly tapering surface 61 terminating in a shoulder or ridge 62 adapted to engage the protective end cap 46. This shoulder 61 tapers inwardly from the shoulder 56 defining the clamp receiving groove so that the conduit is snugly engaged at the point most susceptible to contact with gasoline or other liquid spilled onto the conduit.

To attach the fitting to the free end of a flexible conduit 20, the protective sleeve 54 is inserted over the conduit 20 and pushed back away from the end 40. A protective end cap 46 is then mounted in place in the groove 41 on a fitting nipple 25. Rubber cement or other adhesive is applied to the end cap 46 and the end 40 of the conduit, and to the nipple if desired, and the nipple 25 is inserted into the conduit 20 and positioned so that the end cap covers the conduit end. A wire clamp 35 is then applied in the manner described in the above-identified U.S. patents. The protective sleeve 54 is then slid forward over the clamp 35 so that the clamp is received in the groove 59 and the internal shoulder 61 is engaged with the outer surface 51 of the sleeve portion 49 of the end cap 46.

In order to strengthen the hose and fitting against flexing to prevent the conduit from breaking at the point the inserted end of the nipple terminates, it is our practice to utilize a stiffly resilient flat helical coil spring which fits within the conduit and is secured to the nipple 25. Such a spring 63 may be brazed or soldered into the nipple; however, this often destroys the spring temper needed to prevent sharp bending, kinking or buckling of the hose at the end of the fitting. In action, such a spring rounds out the curve or bend at the point of greatest stress, which is the point where the innermost end of the fitting contacts the conduit.

In order to improve the attachment of the spring within the fitting and hose, the present invention contemplates the provision of an enlarged conical end 64 on the spring 63, which end is tightly received within the fitting. The enlarged conical spring end 64 is desirably formed by gradually increasing the diameter of each of the coils of the spring toward the end to be enlarged. For receiving the spring, the nipple 25 is provided with an internal bore having a tapered internal surface defined therein and tapering from a larger diameter near the outer or threaded end 28 of the nipple to a smaller diameter at the nipple end inserted within the conduit. More specifically, the fitting is provided with a main bore 66 and a slightly larger counter bore 67 connected by an intervening sloping shoulder or surface 65. This tapered surface is of a dimension to snugly engage the enlarged coils at the tapered end 64 of the spring 63, with the balance of the spring 63 extending through the bore 66 and into the conduit in which it adds sufficient stiffness to the conduit to prevent it from buckling or breaking at the point where the nipple terminates.

As an added feature for preventing the coil spring 63 from being removed from the fitting, the latter may be provided with an inwardly directed head or shoulder 68 over which the enlarged coils 64 may snap. Additionally, the enlarged coil end frictionally engages the counter bore 67 to tightly hold the spring in place.

As a further support to prevent the conduit from buckling by bending at the end of the fitting where the nipple terminates, the shoulder 60 on the protective sleeve 54 snugly engages the outer surface of the conduit 20 at a point spaced from the inner end of the nipple. For this purpose, the sleeve is desirably formed of a material which is sufficiently resilient to enable it to be slipped over the wire clamp and yet stiff enough to afford the desired support to the conduit. To enhance the appearance of the sleeve, the outer surfaces are desirably tapered from a point generally corresponding to the internal groove to the respective ends thereof as shown in the drawings. The respective outer ends remain thick enough, however, to afford the desired support.

A modified form of fitting embodying the present invention is shown in FIGURES 8 and 9. This modification finds particular, but not exclusive use, for large diameter conduit. As in the modification previously described, a conduit 20 is provided with a fitting 70 at its free end. The fitting 70 is similar to that described above, comprising a barbed nipple inserted into the conduit and clamped thereto by an appropriate wire clamp 71 similar to that described above. To enclose the coils of the wire clamp and the locking portion, shown at 71a, and at the same time to protect the exposed cut end of the conduit 20, the invention contemplates the provision of a protective cover 72 (FIGURE 9). This protective cover is formed of stiffly resilient rubber, neoprene or other material and comprises a generally sleeve-shaped body having an internal bore 73 in which is defined an annular groove 74 for receiving the wire clamp 71 and its locking portion 71a. At the end of the sleeve 72 adjacent the groove 74, there is provided an internal shoulder 75 terminating at the outer end of the protective sleeve in an inwardly directed annular flange 76. When the protective sleeve is inserted in place over the end of the conduit 20 so as to cover the wire clamp 71, the internal radial surface 78 of the annular end flange 76 adjoins and covers the exposed cut end of the conduit. At the same time, the innermost shoulder or surface 79 of the flange 76 snugly engages the outer surface of the fitting nipple 70, thereby providing a sealing engagement to prevent gasoline or other liquid spilled on the hose and fitting from seeping between the cover 72 and the fitting 70. In this manner, the flange 76 covers and protects the exposed cut end of the conduit 20 and prevents any wicking action in the reinforcing cords 24 of the conduit. As in the form of protective sleeve described in connection with FIGURE 1 the protective sleeve 70 may include on its inner circumferential surface, at the end thereof remote from the fitting, an inwardly directed shoulder or flange 81 which snugly engages the outer surface of the conduit 20 to prevent entrance of undesired materials, liquids, dirt and like foreign substances. Moreover, the protective sleeve is formed of a material which is sufficiently stiff to afford some support to the conduit and prevent it from buckling or breaking when it is flexed.

Still a further modification of the present invention is shown in FIGURES 10 and 11. In this modification, the fitting is employed for connecting two abutting conduits 21, 22. For this purpose, a nipple 90 is inserted into the free end of each conduit, with one-half of the nipple being inserted into one conduit and the other half of the nipple into the other conduit so that the conduits 21, 22 abut each other. One or more clamps 91 are then applied to securely attach the conduits to the nipple. For protecting the wire clamp 91, the fitting embodying the invention includes a protective sleeve 94 which slips over the conduits. The protective sleeve 94 is provided with an internal annular groove 95 for receiving the wire clamps and its locking portion 91a. At each external end of the sleeve, the internal surface of the sleeve is provided with a shoulder 96, 97 which snugly engages the surface of the conduit to prevent the entrance of foreign materials. As in the sleeves described above, inwardly directed flanges or ridges 98, 99 may be provided at the external ends of each shoulder 96, 97.

It will be appreciated that the fittings as described above, as well as additional modifications which will be apparent to those skilled in the art, will find a wide variety of uses on conduits employed in a wide variety of industries, including dairies, breweries, canneries, food processing plants, chemical works, and gasoline processing and distributing plants, and for marine use. Moreover, the fittings can be employed on a wide variety of hose or conduit materials and have been found to substantially increase the life of the hose or conduit on which they are employed and of the clamps with which they are used.

We claim as our invention:

1. In combination, a nipple fitting having an externally barbed portion for insertion into the free end of a conduit, an externally threaded portion, and a wrench-engaging portion intermediate said barbed portion and said threaded portion, said fitting having means defining a bore through said barbed portion, means defining a counter bore in said threaded portion, said counter bore being larger than said bore, an intermediate sloping shoulder connecting said bore and said counter bore, and a conduit reinforcing spring inserted in said bore and counter bore, said spring having conically enlarged coil portions at one end thereof for frictionally and snugly engaging said sloping shoulder, whereby said spring is tightly held within said nipple.

2. A fitting for use on the free end of a conduit for attaching said conduit to an external body, said fitting comprising, in combination, a nipple having an externally barbed end portion for insertion within said conduit, a threaded end portion for engagement with said body, and a wrench-engaging portion intermediate said barbed portion and said threaded portion, means defining a bore within said barbed portion, means defining a counter bore within said threaded portion, said counter bore being larger than said bore, and means forming an intermediate sloping shoulder between said bore and counter bore, a reinforcing spring inserted within said nipple and extending into said conduit, said spring having an enlarged conical end portion frictionally engaged with said sloping shoulder, an external clamp surrounding said conduit and engaging said conduit to said barbed end portion of said nipple, means on said barbed end portion adjacent said wrench-engaging portion defining an external groove in said nipple, an annular cup-shaped end cap snapped into said groove in snug engagement with said nipple for sealingly engaging the free end of said conduit, said cup-shaped end cap having an axially extending flange for sealingly engaging the external peripheral end surface of said conduit, and a protective sleeve snugly surrounding said conduit and said clamp, said sleeve having an internal end shoulder snugly engaging said end cap flange, and said protective sleeve having an internal end shoulder at the end thereof opposite from said flange-engaging shoulder for snugly engaging the external surface of said conduit whereby when said fitting is clamped into place and said protective cover is inserted thereover the conduit is protected from contact by foreign substances and said clamp is protectively enclosed.

References Cited

UNITED STATES PATENTS

| | | | |
|---|---|---|---|
| 701,272 | 5/1902 | Neil | 285—254 X |
| 1,897,319 | 2/1933 | McKee | 285—254 |
| 1,900,511 | 3/1933 | Madden | 285—332 |
| 2,198,996 | 4/1940 | Guarnaschelli | 285—45 X |
| 2,686,962 | 8/1954 | Swann | 285—149 X |
| 2,805,088 | 9/1957 | Cline et al. | 285—45 X |
| 2,904,769 | 9/1959 | Sampson et al. | 285—45 X |
| 3,112,937 | 12/1963 | Williams | 285—149 X |

FOREIGN PATENTS 217,347  6/1924  Great Britain.

CARL W. TOMLIN, *Primary Examiner.*

R. G. BERKLEY, *Examiner.*